United States Patent [19]

Hakansson et al.

[11] Patent Number: 4,501,669

[45] Date of Patent: Feb. 26, 1985

[54] METHOD AND APPARATUS FOR REMOVING LIQUID FROM A SUSPENSION

[75] Inventors: Sven Hakansson, Nynäshamn; Bengt Lundh, Hedemora, both of Sweden

[73] Assignee: Axel Johnson Engineering AB, Nynäshamn, Sweden

[21] Appl. No.: 454,191

[22] Filed: Dec. 29, 1982

[30] Foreign Application Priority Data

Jan. 4, 1982 [SE] Sweden ............................... 8200023

[51] Int. Cl.[3] .............................................. B01D 33/04

[52] U.S. Cl. .................................... 210/770; 100/118; 100/153; 210/401; 210/783

[58] Field of Search ............... 210/400, 401, 770, 783; 162/205, 358, 360; 100/118, 119, 120, 121, 153

[56] References Cited

U.S. PATENT DOCUMENTS

| | | | |
|---|---|---|---|
| 4,142,971 | 3/1979 | LeFur et al. | 210/770 |
| 4,178,251 | 12/1979 | Iwatani | 210/401 X |
| 4,209,361 | 6/1980 | Kankaanpaa | 162/205 |

*Primary Examiner*—Peter Hruskoci
*Assistant Examiner*—W. Gary Jones
*Attorney, Agent, or Firm*—Brumbaugh, Graves, Donohue & Raymond

[57] ABSTRACT

The representative web presses disclosed in the specification include a press drum and a pair of webs to convey a suspension partly around the press drum and two pressure belt means for applying substantially constant pressure against the outer web in the direction radial to the drum along pressure paths which are spaced so as to be substantially symmetrical with respect to the press drum.

10 Claims, 6 Drawing Figures

METHOD AND APPARATUS FOR REMOVING LIQUID FROM A SUSPENSION

BACKGROUND OF THE INVENTION

The present invention relates to a method and an apparatus for removing liquid from materials such as suspensions or slurries, especially by the application of high pressure, so as to produce material is relatively dry.

Several different forms of apparatus, often called web presses, have been known in which a suspension is carried between a pair of driven webs and liquid is removed from the suspension by a squeezing pressure applied by the webs. By passing the webs, which are pervious to liquid, partly around at least one press drum or roll while under tension the suspension carried between them is subjected to a squeezing pressure, thereby removing liquid from the suspension. In order to increase the degree of removal of liquid, a further pressure, in addition to that caused by the web tension, may be applied by a pressure belt or other device which forces the outer web toward the surface of the press drum.

In many such web presses the webs enclose a substantial part of the circumference of the press drum, often exceeding an angle of 180°, and the additional pressure is applied to the outer web along almost the entire region of contact of the webs with the drum surface, resulting in a lateral load on the press drum. This lateral load causes problems with both the press drum and its bearings, especially when a high additional pressure is applied in order to achieve the greatest possible removal of liquid from the suspension. To overcome the problems caused by the lateral load on the press drum it has been necessary to make both the press drum and its bearings larger and stronger than would be required to withstand the pressure applied to the suspension. This is a disadvantage for many reasons, including the increased cost and weight of the belt press.

Furthermore, it has been shown that, at least in certain cases, when continuous pressure is applied to a suspension carried between two webs the desired degree of liquid removal is only achieved during the first portion of the pressure application and the continued application of the same pressure is relatively ineffective in accomplishing liquid removal. Moreover some web presses have webs which are up to two meters or more in width and require correspondingly long press drums. With such long press drums, however, the application of additional pressure in the manner described above causes a significant and undesirable deflection or bending of the press drum.

Accordingly, it is an object of the present invention to avoid the necessity for making the press drum and its bearings larger or stronger so as to withstand the application of additional pressure to a suspension carried between a pair of webs.

Another object of this invention is to make possible the application of additional pressure to a long press drum without risk of deflection of the drum while achieving at least as great a degree of liquid removal as in previously known web presses.

A further object of the invention is to achieve effective liquid removal during the last part as well as the first part of a continuous passage of a pair of webs around a press drum.

SUMMARY OF THE INVENTION

In accordance with the present invention, the above described problems encountered by the application of additional pressure to a pair of webs passing around a press drum are overcome by applying additional pressure to the webs along at least two continuous spaced portions of the path of the webs as they pass around the press drum so that the applied pressure is at least partially balanced with respect to the axis of the drum. In a representative method according to the present invention, a suspension is introduced between a pair of driven webs and subjected to a squeezing pressure by passing the webs partly around at least one press drum and additional pressure is applied radially with respect to the drum axis along at least two continuous pressure paths spaced apart in the direction of motion of the webs, the pressure being substantially constant along each of the spaced pressure paths and being directed so as to at least partially balance the load on the press drum. One form of apparatus according to the invention comprises a pair of webs arranged to carry a suspension between them around a portion of at least one press drum and pressure means for applying a substantially constant and continuous pressure to the webs along at least two continuous spaced portions of the press drum surface so as to at least partially balance the resulting load on the drum.

BRIEF DESCRIPTION OF THE DRAWINGS

For a better understanding of the invention, reference is made to the following detailed description of representative embodiments of the invention taken with reference to the accompanying drawings, in which.

DETAILED DESCRIPTION OF THE PREFERRED EMBODIMENTS

Figure 1:
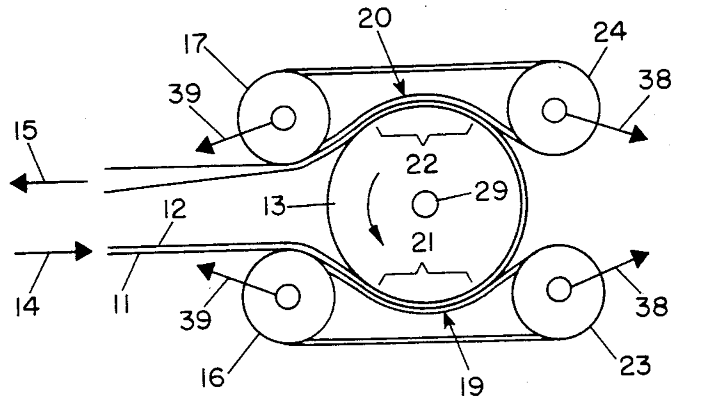
FIG. 1 is a schematic side view illustrating a portion of typical web press embodying the invention.

In all of the typical embodiments of the web press according to the invention which are illustrated in the drawings two previous webs 11 and 12 conveying a suspension (not shown) therebetween move toward a press drum 13 in the direction indicated by an arrow 14 and leave the press drum in the direction indicated by an arrow 15, the webs being guided to and from the press drum by two guide rolls 16 and 17, respectively. As shown in FIGS. 2–6, the guide rolls 16 and 17 are journalled in a web press frame 18 so as to be retained in fixed position with respect to the frame.

Figure 2:
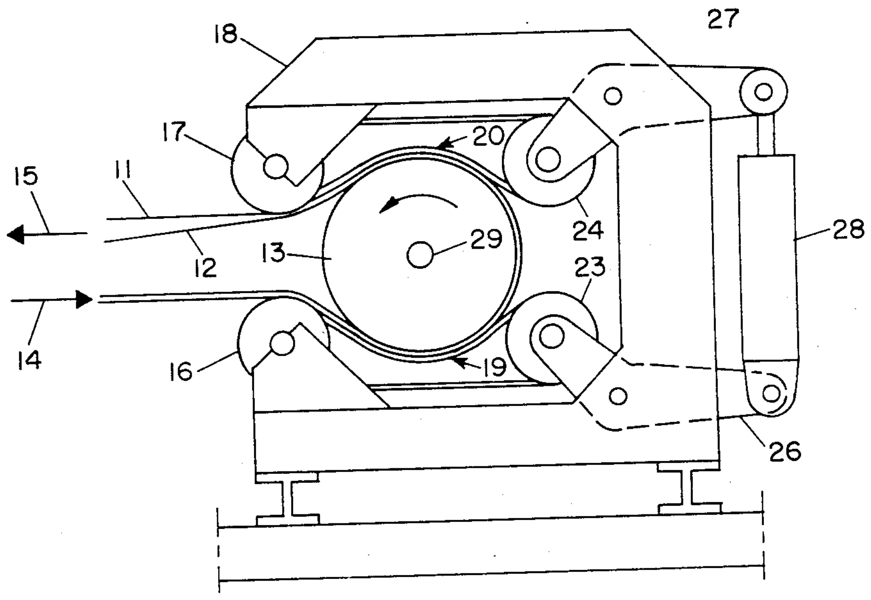
FIG. 2 is a schematic side view showing one embodiment of the invention.
Figure 3:
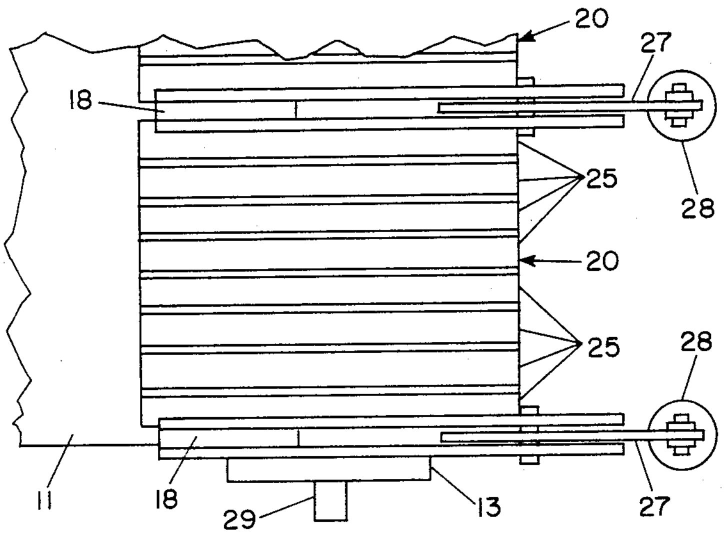
FIG. 3 is a fragmentary top view of the embodiment shown in FIG. 2.

In order to apply additional pressure to the suspension carried between the webs 11 and 12, the illustrated embodiments of the web press of the invention include two pressure belt means 19 and 20, disposed respectively below and above the press drum 13, to apply continuous pressure to the webs as they pass over two spaced portions 21 and 22, respectively, of the surface of the press drum. The pressure belt means 19 and 20 are carried by the guide rolls 16 and 17, respectively, and, in the embodiments shown in FIGS. 2–5, by two further guide rolls 23 and 24 which are movably supported with respect to the frame 18. If desired, a drive means (not shown) may be connected to one of the guide rolls to drive the web press through the corresponding pressure belt means. As best seen in FIGS. 2 and 3, each pressure belt means consists of a series of spaced, parallel band-shaped elements 25 which are preferably elastic belts such as are shown and described in U.S. Pat. No. 4,172,416, for example.

In addition to the pressure resulting from the tension of the webs 11 and 12 as they pass around the press drum 13, the pressure belt means, by applying pressure against the outer web 11 with respect to the press drum 13, causes additional continuous pressure to be applied to the suspension over two spaced extended areas of the press drum surface, thereby increasing the degree of removal of liquid from the suspension. The removal of liquid occurs in the outward direction by passing through the pervious web 11 and through the spaces between the belts 25. If the surface of the press drum 13 is perforated, liquid removal may also occur in the inward direction through the inner web 12 and the press drum surface to the interior of the drum.

Figure 4:
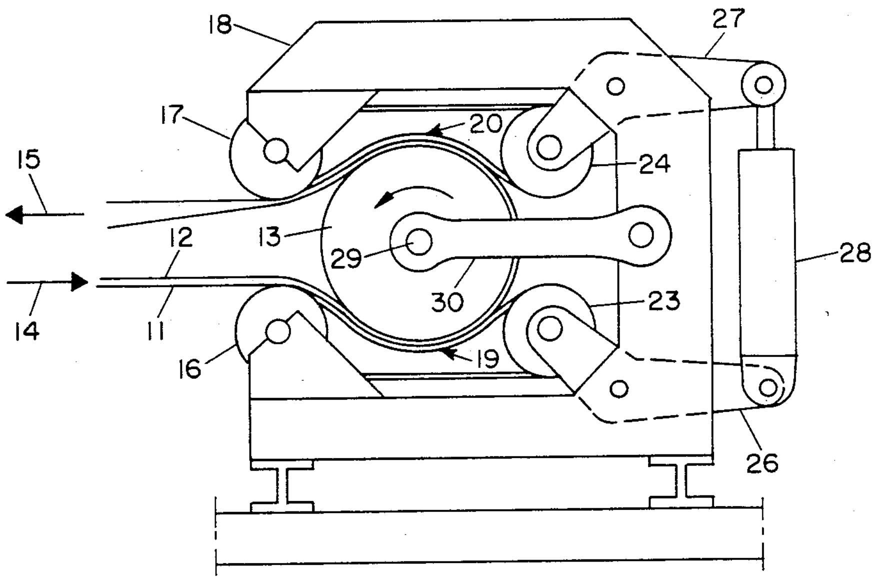
FIG. 4 is a schematic side view illustrating another embodiment of the invention.

In the particular embodiments shown in FIGS. 2–4, the guide rolls 23 and 24 are each journalled at one end in the corresponding ends of two double-armed levers 26 and 27, respectively, the opposite ends of the guide rolls 23 and 24 being journalled in the corresponding ends of similar levers supported by another frame 18 as shown in FIG. 3. Moreover, as illustrated in part in the fragmentary view of FIG. 3, several pairs of belt means 19 and 20 are disposed in adjacent relation between successive frames 18 along the length of the press drum 13. To apply a force to the pressure belt means 19 and 20 which will result in the application of increased pressure to the webs 11 and 12, a pneumatic or hydraulic cylinder 28 is arranged between the other ends of each pair of levers 26 and 27.

In the embodiment shown in FIGS. 2 and 3, the press drum 13 has a support shaft 29 which is journalled at opposite ends in fixed bearings (not shown). The versions of the press illustrated in FIGS. 4 and 5 include an arm 30 which is pivotally mounted at one end on the frame 18 and carries the shaft 29 at its opposite end so as to provide a floating support for the press drum.

In the embodiments shown in FIGS. 2–4, the surface portions 21 and 22 engaged by the pressure belt means 19 and 20 are the same size and the same pressure is applied by both the pressure belt means. To enhance the degree of removal of liquid from a suspension being dried, it is usually desirable to apply increased pressure to the suspension as the liquid content is reduced. This is accomplished in the embodiment shown in FIG. 5 by providing a lever 27*a* supporting the upper guide roll 24 and having a longer arm between its pivot on the frame 18 and the cylinder 28 than that of the lever 26 supporting the lower guide roll 23. Consequently, a greater force is applied to the upper guide roll 24 by the other end of the lever 27*a*, causing a greater pressure to be applied to the drum 13 by the upper pressure belt means 20 than the pressure applied by the lower pressure belt means 19.

Because of the increased pressure applied by the upper pressure belt means, the floatingly supported press drum 13 moves downwardly, increasing the area of contact 21*a* between the drum surface and the lower pressure belt means 19 and decreasing the area of contact 22*a* between the drum surface and the upper pressure belt means 20. Since the total force applied to the drum surface is equal to the pressure multiplied by the area of contact, the total upward force applied to the pressure drum 13 by the pressure belt means 19 over the increased area 21*a* becomes equal to the downward force applied by the upper belt means 20 applied to the decreased area 22*a*, thereby balancing the forces applied at the support shaft 29 and preventing any deflection of the drum as a result of unbalanced forces. Instead of providing a single cylinder connected between each pair of levers 26 and 27 as shown in the illustrated embodiment, different forces may be applied to the levers by providing two separate cylinders (not shown) connected respectively between the end of each lever and the frame 18, thereby permitting independent variation of the pressures applied by the two pressure belt means 19 and 20.

Figure 6:
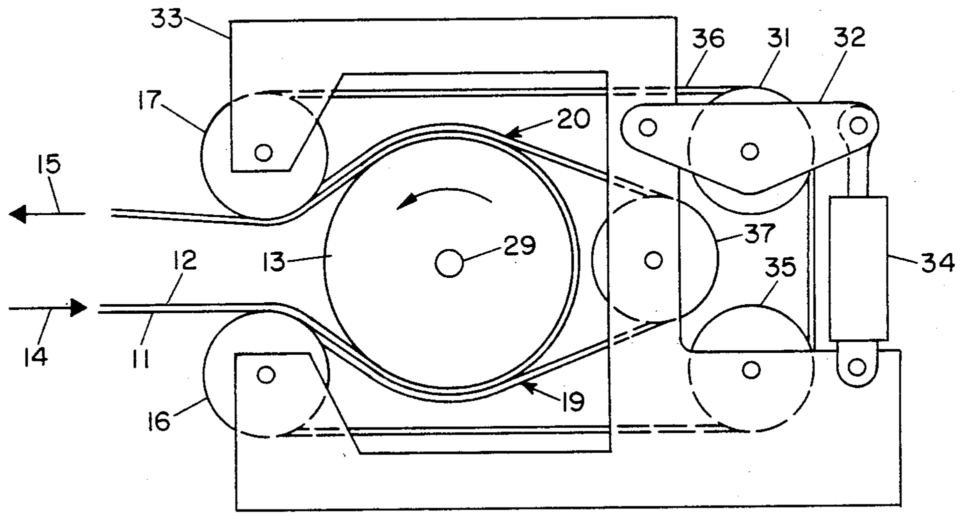
FIG. 6 is a schematic side view illustrating still another embodiment of the invention.

Another embodiment shown in FIG. 6 has an upper guide roll 31 centrally journalled in a double-armed lever 32. One end of the lever 32 is pivotally supported by a web press frame 33 and a pressure cylinder 34 is mounted between the opposite end of the lever 32 and the frame 34. In this arrangement, a lower guide roll 35 is journalled directly on the frame 33 and the two pressure belt means 19 and 20 comprise portions of a single continous set of spaced belts 36, similar to the belts 25 of FIG. 3, which pass around the guide rolls 16, 17, 31 and 35, and a further guide roll 37 supported in the frame 33. As in the other embodiments, the opposite ends of the guide rolls 16, 17, 31, 35 and 37 are supported in another frame (not shown) similar to the frame 31 illustrated in FIG. 6.

The method of the invention and the general operation of the illustrated embodiments of the web press of the invention are best understood with reference to the schematic illustration of FIG. 1. the webs 11 and 12, carrying a suspension to be dried between them, pass in the direction of the arrow 14 past the guide roll 16 and around the press drum 13, passing the guide roll 17 and emerging in the direction of the arrow 15. Tension applied to the webs 11 and 12 is sufficient to cause removal of some of the liquid in the suspension by squeezing action of the webs as they pass around the press drum.

To increase the degree of liquid removal from the suspension, a constant, continuous additional pressure is applied in the radial direction of the drum at the spaced regions 21 and 22 along the drum surface by the pressure belt means 19 and 20. The force applied by the cylinders illustrated in FIS. 2–4 is transmitted to the right hand guide rolls 23 and 24 and through the pressure belt means 19 and 20 to the left hand guide rolls 16 and 17, producing force components at the axes of those guide rolls represented in FIG. 1 by the arrows 38 and 39, respectively. Depending upon the particular direction in which the force is applied to the guide rolls 23 and 24, the magnitude and direction of the right-hand and left-hand guide roll force components 38 and 39 may not be equal. The vertical components transmitted through the press drum 13, however, wll be equal and opposite, thereby balancing each other and causing no excessive lateral force on the press drum 13 or its bearings, regardless of the magnitude of the pressure applied by the pressure belt means 19 and 20.

Figure 5:
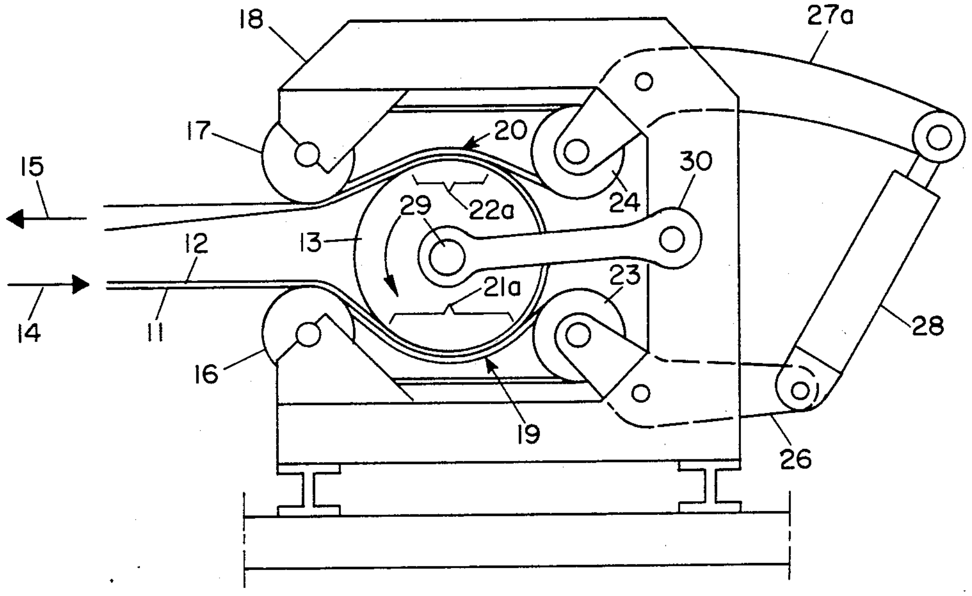
FIG. 5 is a schematic side view of a further embodiment of the invention.

Similarly, in the embodiment of FIG. 5, although greater pressure is applied by the upper pressure belt means 20, the area of the drum surface 22*a* over which that pressure is applied is smaller and the area 21*a* of the drum surface over which the lower pressure belt means 19 applies pressure in correspondingly larger, so that the forces applied to the drum by the pressure belt means are balanced. In FIG. 6 the horizontal force component at the axis of the guide roll 37 balances the horizontal components at the guide rolls 16 and 17 and the vertical force components at the guide rolls 16 and 17 are equal and opposite so that balanced forces are applied to the drum by the pressure belt means 19 and 20.

In accordance with the present invention, as exemplified by the embodiments illustrated and described herein, an improved method and apparatus have been disclosed for removing liquid from a suspension by applying continuous increased pressure over two spaced regions of a press drum. This accomplishes the desired degree of liquid removal without applying excessive lateral loads on the press drum or its bearings, thereby eliminating ay necessity for making the drum or its bearings larger or stronger. Furthermore, long press drums can be used without encountering the problems resulting from the deflection of the drum. In addition, different pressures may be applied to the webs at the two spaced areas of the drum surface, providing an enhancement of the liquid removal.

It should be understood that the invention is not limited to the particular embodiments described herein and is intended to encompass all modifications in form and detail which fall within the scope of the following claims. For example, the portions 21 and 22 of the press drum surface need not be symmetrical with respect to a plane passing through the axis of the press drum and the center lines of portions of the drum surface to which pressure is applied by the pressure means. Also, the pressure belt means can have other configurations than spaced belts and may, for example, consist of a single band or net or other configuration capable of applying uniform pressure over an extended area of the press drum. Furthermore, the suspension to be dried may be carried by a single web 11 which passes as the outer web around the press drum 13. In addition, the web press can be provided with more than two substantially symmetrically positioned press sections while accomplishing the objects of avoiding unbalanced lateral loading of the press drum and its bearings and providing at least as high a degree of liquid removal as is accomplished in prior art web presses, while permitting the application of different additional pressures at spaced portions of the press drum surface.

I claim:

1. A method for removing liquid from a suspension comprising conveying the suspension by at least one web partly around the surface of at least one press drum, applying a first substantially constant pressure to the web in the radial direction of the drum throughout a first pressure path extending along a first portion of the press drum surface, moving the web in the absence of any radially applied pressure on the web to a second pressure path extending along a second portion of the press drum surface spaced from the first portion and applying a second substantially constant pressure to the web in the radial direction of the drum throughout the second pressure path, the second pressure path being applied in a direction to at least partially balance the load on the press drum resulting from the first pressure.

2. A method according to claim 1 wherein the first and second pressures are applied at diametrically opposite portions of the press drum.

3. A method according to claim 1 or 2 wherein the first pressure multiplied by the area of the first pressure path is substantially equal to the second pressure multiplied by the area of the second pressure path.

4. Apparatus for removing liquid from a suspension comprising a press drum, at least one web passing in a path extending partly around the press drum to carry a suspension to be dried therearound, at least two spaced pressure means for applying substantially constant pressure to the web in the radial direction of the drum throughout corresponding spaced portions of the press drum surface which are separated by a portion of the web path extending around the drum in which no radial pressure is applied, the pressure means being positioned with respect to each other so as to substantially balance the load on the press resulting from the application of pressure by the pressure means.

5. Apparatus according to claim 4, wherein the pressure means comprise at least two separate pressure-applying devices.

6. Apparatus according to claim 4, wherein the pressure means comprise two portions of a single pressure-applying device.

7. Apparatus according to claim 4, wherein the pressure means are disposed substantially symmetrically with respect to a plane passing through the axis of the press drum and the center lines of the spaced portions of the press drum surface.

8. Apparatus according to claim 4, including pressure adjusting means for adjusting the pressure applied by at least one of the pressure means wherein the pressure adjusting means includes means for adjusting the pressure means so as to apply different substantially constant pressures throughout the corresponding spaced pressure paths.

9. Apparatus according to claim 8, wherein the pressure adjusting means includes means for causing one pressure means to apply a relatively lower pressure along one relatively longer pressure path and means for causing another pressure means to apply a relatively higher pressure along a second relatively shorter pressure path such that the products of the applied pressure and the path length for the two pressure paths are substantially equal.

10. Apparatus according to claim 9, wherein the pressure path to which the relatively higher pressure is applied is downstream in the direction of movement of the web from the path to which the relatively lower pressure is applied.

* * * * *